United States Patent [19]

Cheng

[11] Patent Number: 5,165,452

[45] Date of Patent: Nov. 24, 1992

[54] LARGE ANGLE DIFFUSER DIVERTER DESIGN FOR MAXIMUM PRESSURE RECOVERY

[76] Inventor: Dah Y. Cheng, 12950 Cortez La., Los Altos Hills, Calif. 94022

[21] Appl. No.: 551,418

[22] Filed: Jul. 12, 1990

[51] Int. Cl.⁵ .............................................. F15D 1/02
[52] U.S. Cl. ........................................ 138/37; 138/39
[58] Field of Search ..................... 138/37, 39, 40, 42, 138/44

[56] References Cited

U.S. PATENT DOCUMENTS

| | | | |
|---|---|---|---|
| 1,642,479 | 9/1927 | Barthel et al. | 138/37 |
| 2,199,525 | 5/1940 | Kurth | 138/37 |
| 2,611,685 | 9/1952 | Yoder | 138/37 |
| 3,075,559 | 1/1963 | Sharp et al. | 138/37 |

Primary Examiner—James E. Bryant, III
Attorney, Agent, or Firm—Cooper & Dunham

[57] ABSTRACT

A design concept and method for a diverter which enables a diffuser to obtain pressure recovery at a very large expansion angle to be comparable to those with less than 15° expansion angle diffusers.

9 Claims, 6 Drawing Sheets

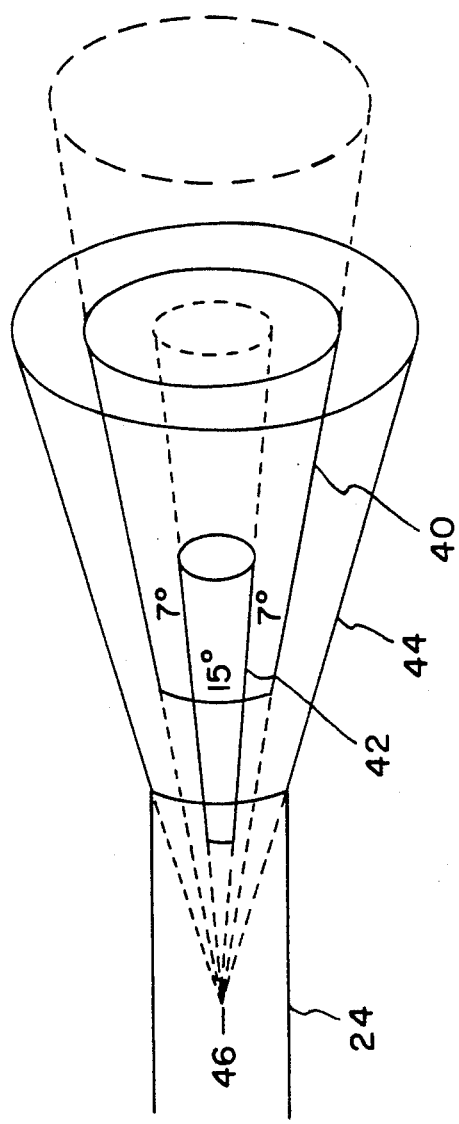

LARGE ANGLE DIFFUSER DIVERTER DESIGN FOR MAXIMUM PRESSURE RECOVERY

BACKGROUND—FIELD OF INVENTION

A new diverter design which allows a large angle diffuser to be designed to have an angle much greater than the traditional 15 degree solid angle, without causing fluid separation, in order to achieve maximum pressure recovery for such a system.

BACKGROUND—DESCRIPTION OF PRIOR ART

The prior art of large angle diffusers was to use diverters to divert some fluid from channels of pipes towards the outside of a larger angle area. Without diverters, the theoretical diffuser requires a no more than 15 degree maximum angle divergence for pressure recovery, which will result in needing a very long distance from entrance to exit for a large area ratio of the diffuser cross section. Such a long diffuser is sometimes not practical in industrial applications. However, some of the flow systems are left with no choice but to follow such design restrictions. For example, the steam ejector pumping systems and some of the wind tunnel designs will have to obey the 15 degree angle rule. This requires a lot of space and land for the installation. In industrial applications, pipes with a small diameter, but with a high-speed fluid velocity joining to a larger pipe, must use a larger angle diffuser. Pressure loss and turbulence will be generated; however, the pressure loss and the turbulence is taken as system losses, with no means to correct the so-called throttling phenomena. High noise levels frequently accompany such an installation.

Other diverters, such as the air exit diverter, for air conditioning into a room, for example, are effective to a certain extent, but the flow distribution is not nearly perfect to give the maximum efficiency or flow distribution to a room. The difficulty of such a problem has been in existence for many years, since the beginning of the study of fluid mechanics. The advent of compressibility and aerodynamics brought the diffuser problem into even sharper focus, such that the air inlet duct of jet engines has to be long and narrow angled in order to prevent flow separations that can cause engine pulsation and flame out. In a wind tunnel circuit, air is being pushed by a compressor. The air needs to be cooled down before it can pass through the test sections. The air will pass through a heat exchanger, which has a much larger cross sectional area. Normally, a wide angle diffuser is used to accommodate large area changes for the heat exchanger installation and pressure recoveries in order to cool the air down effectively. Otherwise, the wind tunnel circuit would require almost twice the piping distance, making it necessary to acquire more real estate and incur added cost just to get the pressure recovery. Diverters of various kinds have been used and thought of, but none of them have been very effective; hence, the prior art diverters have not been able to focus on the primary cause of the flow separation and the reason for the 15 degree angle limitations for unseparated fluid flow through a diffuser. On the other hand, fluid flow measurement always utilizes pressure drop systems such as a Ventura tube or an orifice plate. Diffusers have never been used as a fluid flow metering system due to its uncertainties in pressure recovery performance.

OBJECTS AND ADVANTAGES

A new invention is disclosed as a method to design diverters for large angle diffusers without the limitation of the angle of the diffuser to 15 degrees. This design is the result of an investigation into the nature of viscous fluid mechanics, and has gone through experimental test verifications. The design rules were laid out to be extremely simple. The newly designed geometry has the similarity effect independent of the velocity of the flow. With such a diverter, the pressure recovery of a large angle diffuser is just as effective as a 15 degree divergent angle diffuser in pressure recovery. In this case, the dynamic head associated with high fluid flow velocity through a small pipe will be totally recovered as potential energy "pressure" instead of heat and entropy loss. This will allow the design of piping systems in fluid mechanics to be flexible, and will shorten the pipe length of any piping system. The design is based on a source and sink concept and viscous flow phenomena.

The diverter design also creates a side effect which benefits fluid systems; that is, to reduce or remove water hammer effects by assuring that any fluid going backwards will encounter great resistance. This is a way to reduce the water hammer propagating from downstream to upstream. Once the diffuser system for pressure recovery can be made dependable, it can utilize the pressure rise to measure the fluid flow, which avoids unnecessary pressure loss in piping systems.

The objectives of this invention are to provide a simple, novel design for diverters, with maximum pressure recovery for arbitrary wide angle diffusers, and also to prevent water hammer. Another objective of the invention is to construct a pressure recovery fluid metering system in contrast to the pressure loss system.

The advantage of the design is that it is a simple, fixed geometrical fixture in the piping system such that once installed, it is independent of the operation demand of the fluid system. The pressure recovery can reach a 90 percent or greater range, compared to the 75 percent range without a diverter. This will greatly enhance the energy efficiency of piping systems for pumps, power plants, steam ejectors, and many other applications which require diffusers.

DRAWING FIGURES

FIGS. 5a and b illustrates the source concept of a fluid and the intersection of the solid angle of a source.

FIG. 6 illustrates the application of the point source concept for the large angle diffuser design incorporating the viscous flow effects.

Figure 7B:
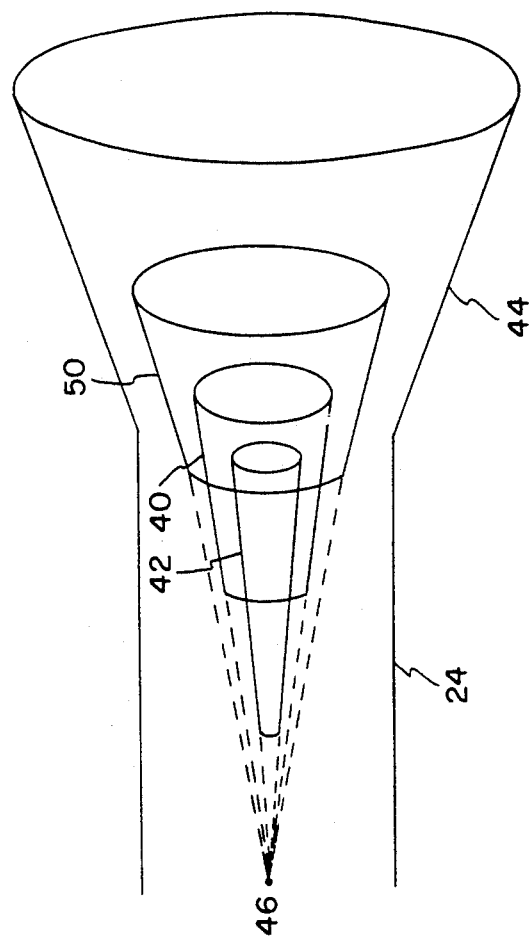
Figure 7A:
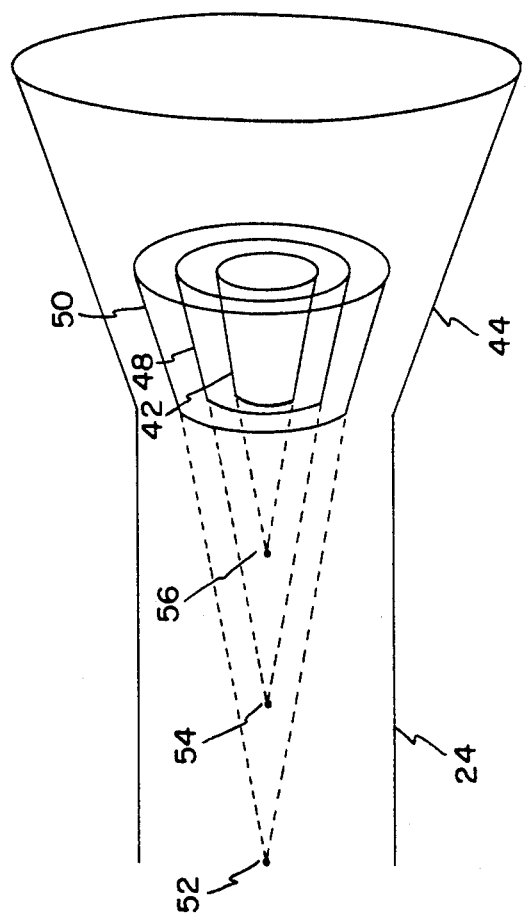

FIG. 7a illustrates a conventional diverter without a point source concept.

FIG. 7b illustrates the diverter with the point source concept in large angle diffusers.

Figure 8:
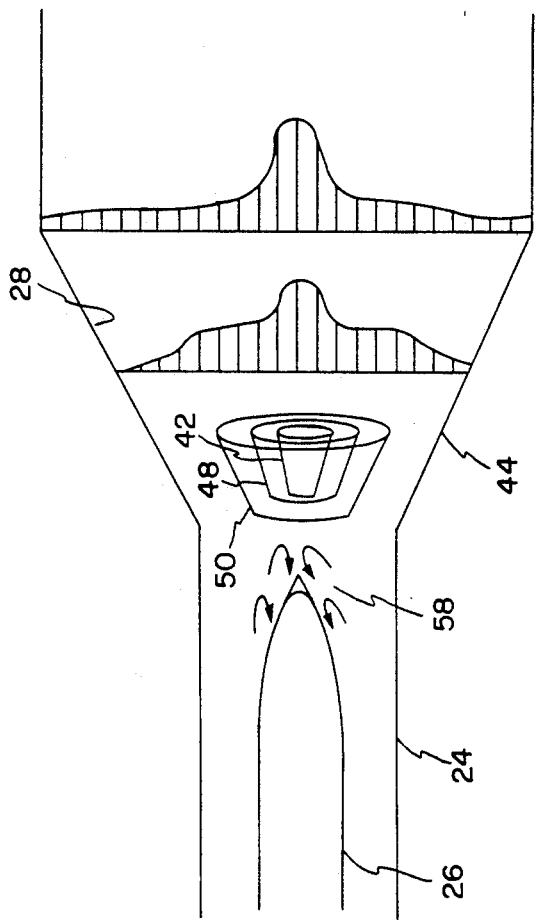

FIG. 8 illustrates the pressure profiles of experimental tests of a diverter without a point source concept.

Figure 9:
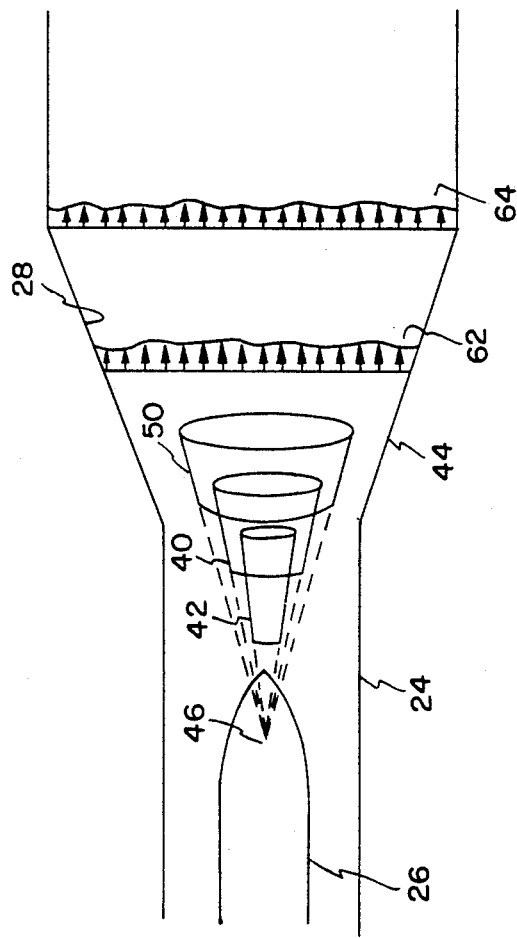

FIG. 9 illustrates the pressure profile measurement of a point source diverter concept.

DESCRIPTION—FIGURES 1 TO 9

Figure 1:
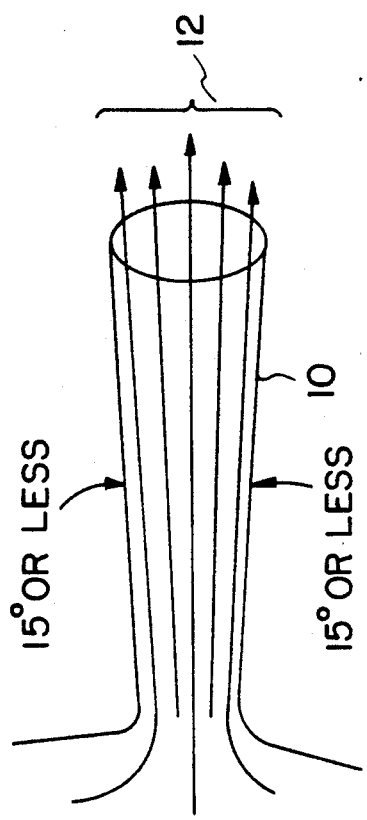
FIG. 1 illustrates the typical streamline of a 15 degree divergent diffuser for maximum pressure recovery.

FIG. 1 is a 15 degree angle diffuser. The diffuser wall is indicated by 10, and the streamline pattern is 12. This configuration was found experimentally to be the limitation for maximum pressure recovery. Otherwise, the pressure recovery can be described by a one-dimensional equation without regard to the angle of the diffuser system. However, experimentally it is found that is not true, and this angle hitherto has been treated as an empirical effect with mystics.

Figure 2:
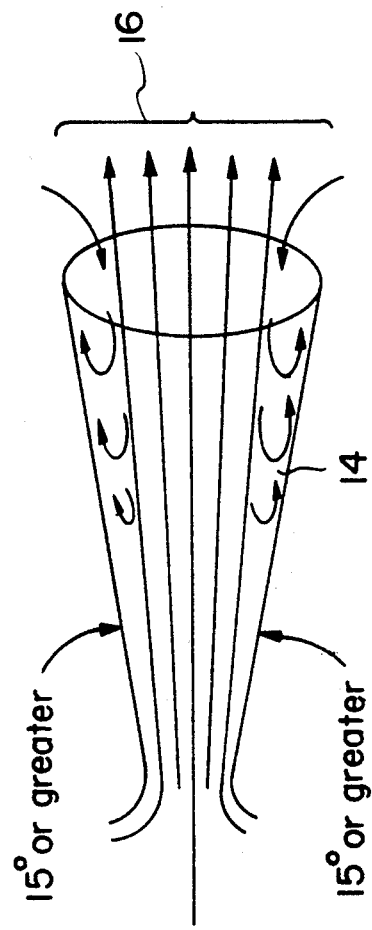
FIG. 2 illustrates a wide angle diffuser which sometimes has to be used in the industry.

FIG. 2 illustrates a similar diffuser, with an angle much greater than 15 degrees, which would have to be used in certain piping systems or wind tunnels. Here, the wall of such a large angle diffuser is 14, and the streamline pattern is indicated by 16. On the side wall are separation regions of the flow, which are generally found in such a large angle diffuser. In other words, the wide angle diffuser wall has no influence on how the fluid will flow in such a large angle diffuser. As a result, the pressure recovery, which is defined by kinetic energy converting back to pressure (Bernoulli's equation), can never be achieved. The ratio of the entering total head (which is the sum of the kinetic energy and the pressure), versus the total head after the diffuser, is the definition of the efficiency of pressure recovery in terms of percentages. Since the fluid always has viscosity, the idea of one-dimensional flow, which ordinarily can describe the flow phenomenons, really does not apply in terms of diffuser designs.

Figure 3:
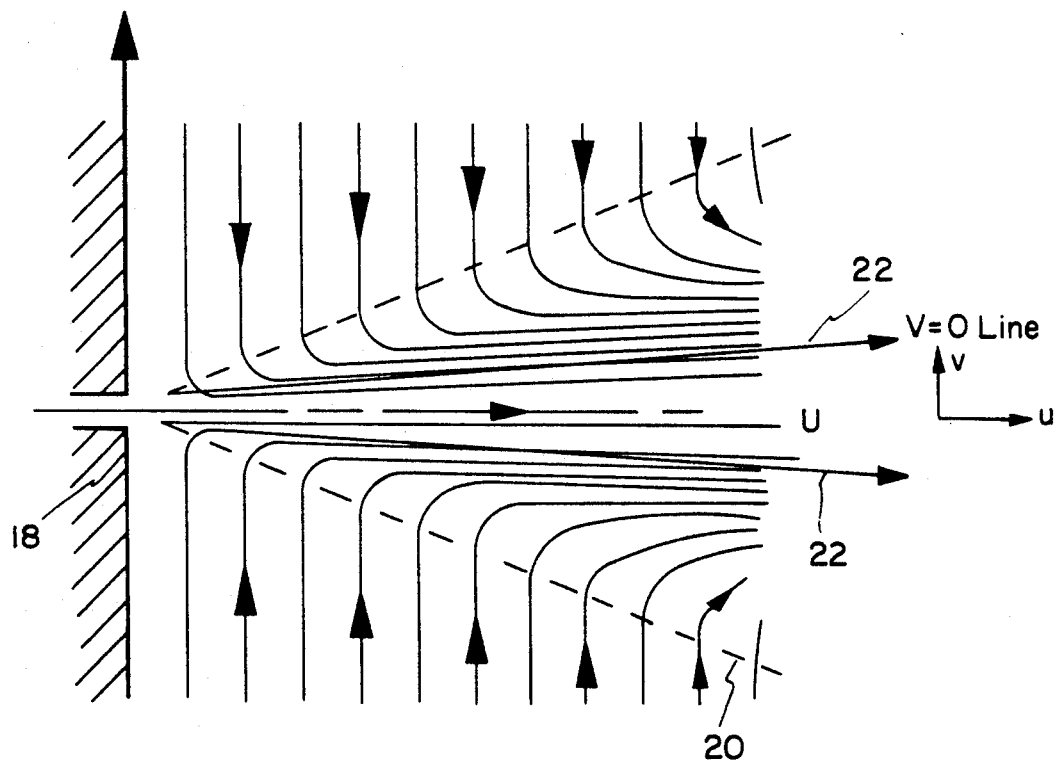
FIG. 3 illustrates the streamline pattern of a high speed small jet issuing from a plane wall into a stagnant air stream.

FIG. 3 is a typical streamline pattern including the viscous effect being measured and analyzed. The high speed jet is coming through a wall, depicted by 18, and the streamline patterns are depicted by 20. There are two lines 22, called the V=O line. V is the vertical velocity perpendicular to the axis of the jet. The streamline analyzed here is a circular jet, which can be considered as a point source issuing a parallel velocity in the axial direction in the form of a stream tube. The velocity is called U. In the perpendicular to the axial direction, the velocity is called V. The analysis shows that at the beginning there is no vertical velocity. The viscous force, however, will eventually drag the surrounding fluid along with the jet, and when that happens, the conservation of momentum applies, so the original jet will be slowed down. The conservation of mass also applies such that the original material within the stream will increase in its diameter in such a way that within the stream tube, the total fluid is equal to the material being issued from the jet. Conservation of momentum tells us that now the total mass of the jet plus the mass being dragged along times the slowed down velocity profile equals the momentum of the original jet. This effect is purely due to the viscosity of the fluid, however small the viscosity may be.

The streamline analysis is based on a similarity property of the fluid; in other words, the streamline pattern is a geometrical shape. If the velocity of the jet is faster, then the surrounding material will be dragged in at a higher rate. If the jet velocity is slower, then the surrounding material will be dragged in at a slower rate.

The dotted line in FIG. 3 indicates the boundary wherein the velocity will turn around in a way that the fluid coming inwards is turning towards the axial direction. In other words, outside the dotted line, there is a component of the velocity radially, or perpendicular towards the axis, and vice versa inside the dotted line. This is due to the fact that the slowing down of the original material requires the expansion of the stream tube; therefore, it introduces a velocity component toward the larger radii; in other words, away from the axis of the jet. On the other hand, due to the material that is being dragged into the jet by the viscous force, material also is coming inward toward the axis of the jet; therefore, the dotted line is the Mean Value, where the fluid velocity will be zero. This is indicated by 22, called radial velocity V=O line. When the similarity analysis was done, applying the viscosity of air or water, it was found that the V=O line is approximately 15 degrees. The inventor discovered the basis for the empirical limitation of the 15 degree divergent angle of a diffuser used throughout history. The 15 degree diffuser limitation is a natural phenomena, so one cannot change it. Outside the 22 V=O line, the velocity in the radial component is going towards the axis, and inside of the V=O line, the velocity is towards the outside, indicating a good diffuser effect in slowing the velocity down. Therefore, for a wall of a large angle diffuser greater than the angle of 15 degrees, separation will occur as a natural phenomenon.

Figure 4:
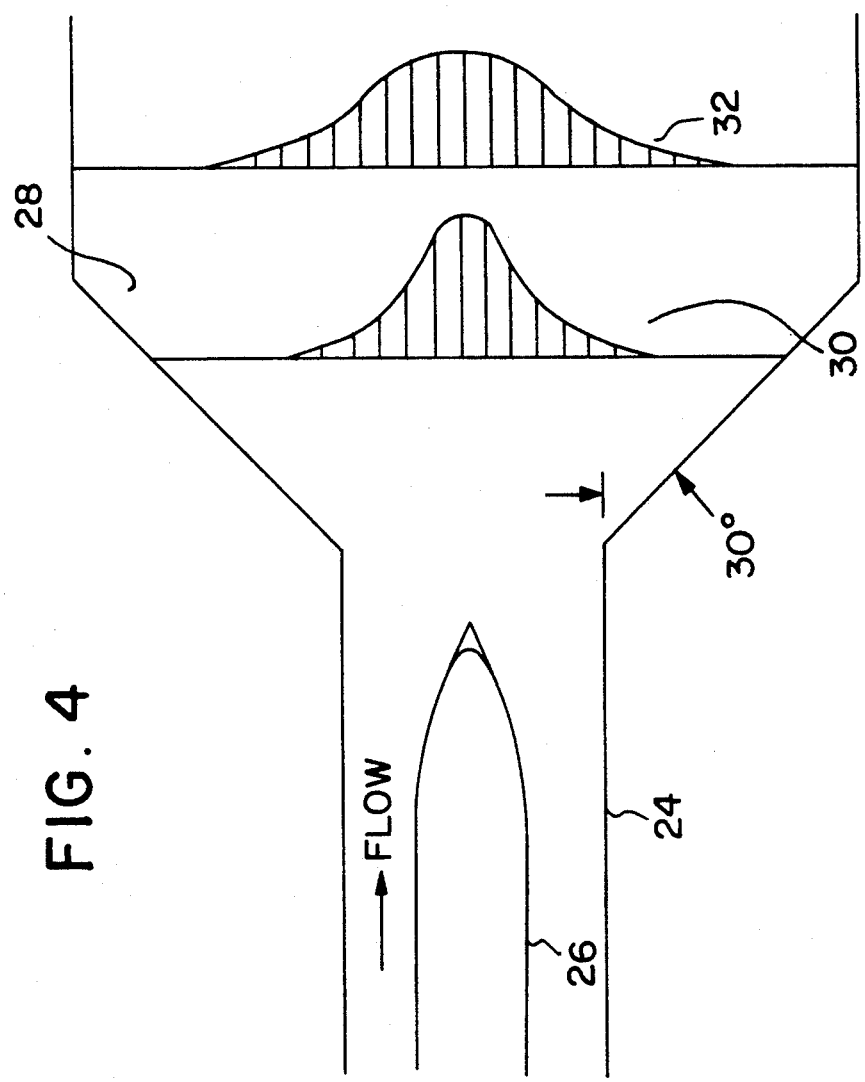
FIG. 4 illustrates the experimental test for simulating a 60 degree wide angle diffuser with a boattail arrangement in a scale modeling of a realistic device.

FIG. 4 represents an experimental test of a pipe joining into a 60 degree wide angle diffuser with a half angle of 30 degrees. 24 is the pipe that leads to the large angle diffuser. 26 is a boattail, which normally is considered to smooth the flow before entering the large angle diffuser. 28 is the Pitot tube used to measure the pressure profiles at various cross sections of the diffuser. 30 is the pressure profile at mid plane of the diffuser, and 32 is the pressure profile at the exit plane of the diffuser. The experimental measurement was not surprising in the sense that outside of the pressure profile region there was separated flow region, large recirculation, and the pressure was not recovered due to turbulence and separation from the walls from such a diffuser.

In order to understand what can be done by incorporating a large angle diffuser, we introduce the point source concept first. FIG. 5a is assuming a dimensionless point source 34 issuing fluid out with a fixed mass. 36 is a constant velocity spherical surface. Velocity would have to be uniformly perpendicular to the spherical surface independent of whether the fluid is viscous or compressible fluid. This is extremely crucial, because the viscosity or compressibility effects have not come into play for such a streamline system.

FIG. 5b indicates that if we have a solid cone 38 as an interception of the solid angle starting from the point source 34, such a solid angle can be used to design the large angle diffuser diverter.

FIG. 6 is a conceptual point source 46 inside the pipe of a large angle diffuser, assuming the diffuser 44 is still joined with the pipe 24. The diffuser now will have concentric cones focused at the point source 46, but the first cone 42 will have a solid or total angle of 15 degrees, and the second cone 40 will have a 7 degree or no more than 7.5 degree solid angle located half the length downstream of the first cone such that they also converge to the same point 46. If the angle of the diffuser 44 is larger, then a third cone will be introduced. In this case, the spacing between the second cone and the outer wall of the diffuser will be within the range of 7.5 degrees. Therefore, each cone represents a solid angle of a point source issued from 46, and the velocity distribution of such a design will be independent of the viscous effect. This concept is extremely important such that if they are not focused on the same point 46, then they are not intercepting the fluid issuing from a point source. The viscous effect will still enter into play, and the large angle diffuser will still have operational-dependent problems and pressure distribution problems. Each cone should be staggered in such a fashion that the outer wall of the first cone will divert all the fluid towards the outside. Instead of the diffuser effect on the inner wall, a deflection effect by the outer wall is created, which is known to have no separation effect, and therefore the second cone will intercept the streamline, diffuse the fluid inside the cone and also deflect the fluid on the outside surface of the cone, and so on. This can be applied to as many cones as is required.

FIG. 7a is an illustration assuming there are a number of convergent cones, starting with 15 degree diverter 42 and also 7.5 degree diverters 48 and 50. The system again starts with the pipe 24, and a diverter, 44. The diverters are coplanar. This is a very common design for air conditioning duct exits. The focal point of each cone is located along the axis as points 52, 54 and 56.

FIG. 7b is similar to the configuration shown in FIG. 6. These are the configurations used to test a traditional diverter versus a point source diverter concept.

FIG. 8 shows a similar configuration for a 60 degree angle diffuser 44. A Pitot tube 28 was used to measure the pressure profiles at mid plane and at the exit plane. A diverter was located just at the inlet of the diffuser. The boattail body is indicated by 26. Experimentally separation was found coming off the boattail, indicated by 58, and the fluid indeed was being channeled toward the outside of the large angle diffuser. However, a large velocity cone is still present in the middle of the diffuser. In other words, there is some improvement, but it is still not very effective. Sometimes a diverter of this kind is used for air conditioning ducts, but is not used a majority of the time because the effectiveness is not warranted for the price of an installation of this type of diverter in fluid systems.

FIG. 9 is a similar diffuser used to perform the experimental verification of the design concept. Here the diverter is located partially inside the pipe, causing each cone to converge onto a virtual source, 46. The pressure profile was again measured at the mid plane and exit plane. The experimental results showed that the separation at the boattail was totally removed, and the velocity profile at mid plane 62 was extremely flat. The wide angle diffuser obeys now the solid angle spherical diffusion effect such that a diverter does not have to carry all the way through the large angle diffuser, and the velocity is continuously being slowed down, as indicated by the pressure profile 64. A U-tube 72 can be connected to the upstream 66 and downstream 70 of the diffuser. The U-tube fluid 68 provides a deflection $\Delta H$ to measure the pressure recovery. This of course can be any other pressure differential instrument. The figure's use of a U-tube is for illustration purposes only. The pressure differential can be used as a velocity measurement.

From the above figures, it becomes obvious that my invention involves a point source diverter design which can be extremely effective in pressure recovery for any arbitrary angle for a diffuser design. The rules of the design were the diverter cones all have to be converged from the point source, using the outer wall of the diffuser as a guide to locate where the point source ought to be inside a connecting pipe. The second rule is that the first diverter cone would be no greater than 15 degrees; the second one will be no greater than 15 degrees solid angle over the first one, preferably located halfway downstream from the first cone; and the third one will be no greater than 15 degrees solid angle over the second one, and so on, until the spacing between the diverter and the outer wall will be within a 15 degree solid angle. The stagger is required in order to have the diverter of the smaller cone to divert the fluid on the outside of the cone and diffuse the fluid on the inside of the cone. The length of the diverter does not have to be very long in comparison to the diffuser itself. The sole purpose of the diffuser is to divert the fluid in such a way that the high velocity flow from a pipe now behaves as the flow coming from a point source. From that point of view, the large angle diffuser becomes an interception of just a solid cone of a point source flow and does not require the diverter to be the same length as the diffuser. Since this concept overcomes the viscous fluid effects, it is independent of the fluid used and independent of the velocity in operation for a large angle diffuser. The measured pressure recovery was over 90 percent.

RAMIFICATIONS, SUMMARY AND SCOPE

From the above description, the ramifications of a large angle diffuser diverter design for pressure recovery are many, and is a breakthrough in fluid system design. The ramifications are:

1) The diffuser length was shortened for a good pressure recovery design;

2) it will not produce turbulence due to wall separations for wide angle diffusers;

3) it will not generate heat due to the separation of the flow as in ordinary wide angle diffusers;

4) it will save energy and recover the kinetic head into useful pressure head in the most efficient way; and 5) due to a diverter in such a fluid, the diffuser will eliminate pressure pulse effects to reduce water hammer propagation from downstream to upstream.

The ramifications of the invented diffuser are that a piping system will be able to get by with a lower pressure rise, thereby increasing energy savings for the application because losses have been reduced in the piping system. The additional turbulence reduction will prevent the non-uniformity of flow to heat exchangers, making the heat transfer much more effective for heat exchanging or condensers tube sheets, et cetera. The design concept is so simple that if the diverter design obeys the invented rules, then it will have the previously illustrated effect.

The concept has been verified experimentally; however, the experimental verification was done in a water tunnel and the compressible effect of a fluid at very high Mach numbers can deviate from the angle defined in the changes outlined here, and the disclosure only illustrates the method to define streamlines in a way that the point source concept can be applied. In the case of a compressible fluid, a supersonic point source will eventually reach a Mach number equal to one condition and become subsonic from thereon; however, in a supersonic regime, the point source concept still can be applied, but the diverter design, including the viscous affects, will merely have some modifications over the non-compressible geometries. Therefore, the disclosure is merely to illustrate the point source concept for large angle diverter designs. In the case of jet inlet and supersonic and hypersonic wind tunnel diffusers, the same method can be applied to design the diverters based on the examples given in the disclosures.

I claim:

1. A diverter system for a wide angle diffuser which is focused at a focal point and has a central axis, said system comprising a series of truncated cones each of which has a central axis, all of said central axes substantially coinciding, and all of said cones being focused substantially at said focal point, the innermost cone having a full cone angle of approximately 15° or less, the successively outer cones being staggered with respect to each other along the central axes thereof to provide flow diversion from each cone to the successively outer cone, and the half-angle difference in divergent angle between any two adjacent cones being no greater than 7.5°.

2. A system as in claim 1, in which the divergent angle of the innermost cone is 15° and in which the half-angle difference in divergent angle between any two adjacent cones is 7.5°.

3. A method to recover pressure by a wide angle diffuser with divergent angle greater than 15° comprising providing a series of coaxial and axially staggered truncated cones each of which has an inner surface and an outer surface, with the innermost cone having a divergent angle no greater than 15°, and with said cones axially staggered at a stagger distance between adjacent cones that is sufficient to cause fluid flowing axially toward said cones and diverted from the outer surface of a cone to be intercepted by the subsequent cone, wherein the divergent half angle between adjacent cones is less than 7.5° in order to avoid flow separation, and causing fluid to flow in said axial direction toward said cones, each cone providing flow diversion into the successively outer cone.

4. A method as in claim 3 in which the providing step comprises setting the divergent angle of the innermost cone to 15° and setting the half-angle difference in divergent angle between any two adjacent cones to 7.5°.

5. A method as in claim 4 in which the providing step comprises setting the half-angle difference in divergent angle between said diffuser and the outermost of said cones to 7.5°.

6. A system comprising:
   a conduit for fluid flowing in a flow direction, said conduit having a diffuser into which said fluid enters, said diffuser being in the form of a truncated cone having a central axis and being centered at a focal point;
   a plurality of diverter cones which are shaped and are positioned relative to the diffuser cone such that each diverter cone has a central axis substantially coinciding with the central axis of the diffuser cone and is focused substantially at said focal point of the diffuser cone;
   the innermost of said diverter cones having a divergent angle of no more than 15° and the difference in divergent half-angle between any two adjacent diverter cones being no more than 7.5°; and
   the diverter cones being staggered in the flow direction to cause each cone to provide flow diversion into the successively outer cone.

7. A system as in claim 6, in which said diverter cones are staggered along said flow direction and, as between any two adjacent diverter cones, the upstream end of the diverter cone that has a larger cross-section is at about the axial midpoint of the adjacent diverter cone that has a smaller cross-section.

8. A system as in claim 7 in which the divergent angle of the innermost diverter cone is 15° and in which the difference in divergent half-angle between any two adjacent diverter cones is 7.5°.

9. A system as in claim 6 in which said diffuser cone and said diverter cones have circular cross-sections.

* * * * *